United States Patent [19]

Chao

[11] Patent Number: 5,883,688

[45] Date of Patent: *Mar. 16, 1999

[54] EYEGLASS FRAMES WITH ARMS AND FLAPS

[75] Inventor: David Yinkai Chao, Towson, Md.

[73] Assignee: Contour Optik, Inc., Chiayi, Taiwan

[ * ] Notice: The term of this patent shall not extend beyond the expiration date of Pat. No. 5,877,838.

[21] Appl. No.: 847,709

[22] Filed: Apr. 28, 1997

[51] Int. Cl.$^6$ ....................................................... G02C 9/00
[52] U.S. Cl. ................................................. 351/47; 351/57
[58] Field of Search .................................. 351/47, 48, 57, 351/58, 41, 44

[56] References Cited

U.S. PATENT DOCUMENTS

| 4,070,103 | 1/1978 | Mecker . | |
|---|---|---|---|
| 5,568,207 | 10/1996 | Chao | 351/57 |
| 5,642,177 | 6/1997 | Sunreeve . | |

FOREIGN PATENT DOCUMENTS

| 76209045 | 9/1979 | China . |
|---|---|---|
| 1061253 | 4/1954 | European Pat. Off. . |
| 85 07 761.5 | 6/1985 | Germany . |
| 88 06 898.6 | 10/1988 | Germany . |
| 2-109325 | 8/1990 | Japan . |
| 7-128620 | 5/1995 | Japan . |
| WO 90/09611 | 8/1990 | WIPO . |

OTHER PUBLICATIONS

Documents describing Twincome in a Patent Opposition Proceeding in Germany initiated by Pentex, on or around Apr. 30, 1997.

*Primary Examiner*—Hung Xuan Dang
*Attorney, Agent, or Firm*—Fliesler Dubb Meyer & Lovejoy, LLP

[57] ABSTRACT

An eyeglass apparatus includes a primary frame having two side studs for pivotally coupling two legs. An auxiliary frame for disposing in front of the primary frame includes two sides each having an extension for engaging with the outer portion of the leg. The extensions each includes a magnet for engaging with another magnet engaged in the leg or with the magnetic leg and for securing the auxiliary frame to the primary frame. The extensions each includes a clamping member for securing to the legs without the magnets.

3 Claims, 1 Drawing Sheet

EYEGLASS FRAMES WITH ARMS AND FLAPS

BACKGROUND OF THE INVENTION

1. Field of the Invention

The present invention relates to a pair of eyeglasses, and more particularly to a pair of eyeglasses having an auxiliary frame for supporting auxiliary lenses.

2. Description of the Prior Art

The closet prior art of which applicant is aware is U.S. Pat. No. 5,568,207 to Chao and has been assigned to the present assignee. The auxiliary frame may not be engaged with the legs.

The present invention has arisen to provide a novel configuration for securing the auxiliary frame to the primary frame.

SUMMARY OF THE INVENTION

The primary objective of the present invention is to provide an eyeglass apparatus in which the legs of the primary frame each includes a magnet for engaging with a hook and/or a magnet of the auxiliary frame for solidly and stably securing the auxiliary frame to the primary frame.

In accordance with one aspect of the invention, there is provided an eyeglass apparatus comprising a primary frame including two sides each having a stud, two legs pivotally coupled to the studs respectively and each including an outer portion, an auxiliary frame for disposing in front of the primary frame, the auxiliary frame including two sides each having an extension for engaging with the outer portion of the leg, and means for securing the extensions to the legs and for securing the auxiliary frame to the primary frame.

The legs are made of magnetic material, the securing means include two magnets engaged in the extensions for engaging with the legs and for securing the auxiliary frame to the primary frame.

The extensions each includes a clamping member having an arm for engaging over the leg and a flap extended downward for engaging with the leg.

The securing means includes two first magnets secured in the legs and includes two second magnets secured in the extensions for engaging with the first magnets.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
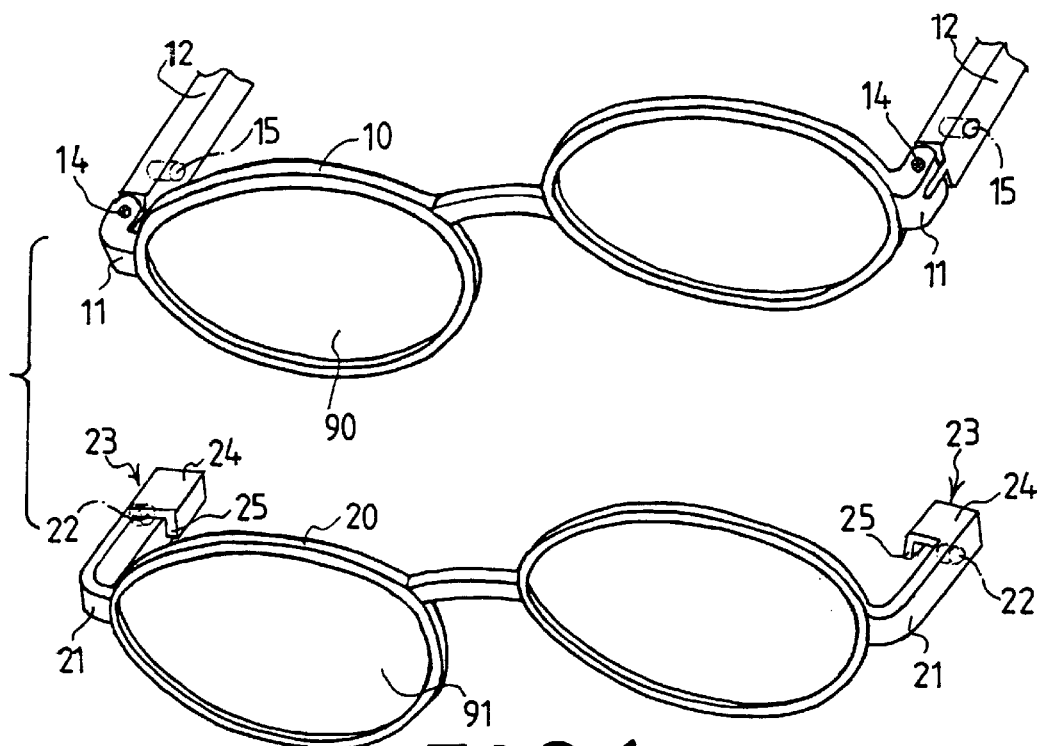
FIG. 1 is an exploded view of an eyeglass apparatus having an auxiliary frame.
Figure 2:
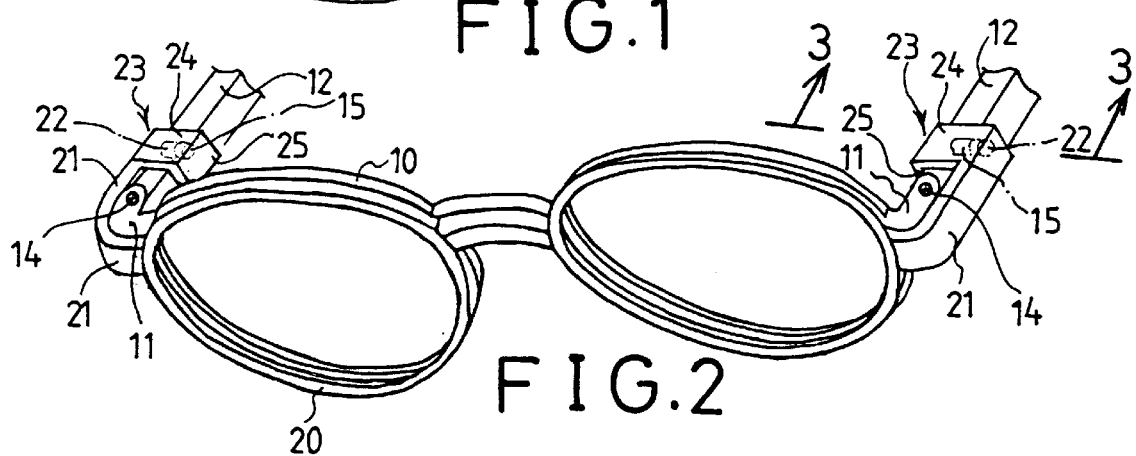
FIG. 2 is a perspective view of the eyeglass apparatus.
Figure 3:
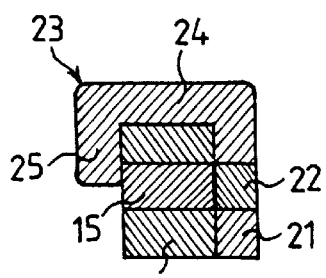
FIG. 3 is a cross sectional view taken along lines 3—3 of FIG. 2.

Referring to the drawings, and initially to FIGS. 1 and 2, an eyeglass apparatus in accordance with the present invention comprises a primary frame 10 for supporting primary lenses 90 and including two studs 11 formed in the side portions. Two legs 12 each is pivotally coupled to the studs 11 at a pivot shaft 14 and each includes a magnet 15 secured close to the pivot shaft 14. An auxiliary frame 20 for supporting auxiliary lenses 91 and for disposing in front of the primary frame includes two extensions 21 disposed in the side portions and extended rearward for engaging with the outer side portions of the studs 11 of the primary frame 10 respectively. The extensions 21 each includes a magnet 22 for engaging with the magnet 15 of the stud 11 and for securing the auxiliary frame 20 to the primary frame 10.

It is preferable that the extensions 21 each includes a hook member 23 having an arm 24 for engaging over the upper portion of the leg 12 and having a downward dependent flap 25 for resiliently engaging with the leg 12 and for further stably securing the auxiliary frame 20 to the primary frame 10.

Alternatively, when the legs 12 are made of magnetic material, such as metal, the magnets 22 may also engage with the legs 12 for securing the auxiliary frame to the primary frame without the magnets 15.

Alternatively, without the magnets 22, 15, the flaps 25 of the clamping members 23 of the extensions 21 may solidly engage with the legs 12 for solidly securing the auxiliary frame to the primary frame without the magnets 15.

Accordingly, the eyeglass apparatus in accordance with the present invention includes a primary frame having two magnets secured in the legs for engaging with the magnets of the auxiliary frame and for solidly and stably securing the auxiliary frame to the primary frame. The extensions of the auxiliary frame may each include a clamping member for solidly securing the auxiliary frame to the primary without the magnets.

Although this invention has been described with a certain degree of particularity, it is to be understood that the present disclosure has been made by way of example only and that numerous changes in the detailed construction and the combination and arrangement of parts may be restored to without departing from the spirit and scope of the invention as hereinafter claimed.

I claim:

1. An eyeglass apparatus comprising:

a primary frame including two sides each having a stud;

two legs pivotally coupled to said studs respectively and each including an outer portion; and an auxiliary frame for disposing in front of said primary frame, said auxiliary frame including two sides each having an extension for engaging with said outer portion of said leg, said extensions each having an arm for engaging over said leg and a flap extended downward for engaging with said leg for securing said auxiliary frame to said primary frame.

2. An eyeglass apparatus according to claim 1, wherein said legs are made of magnetic material, said extensions include two magnets for engaging with said legs and for securing said auxiliary frame to said primary frame.

3. An eyeglass apparatus according to claim 1, wherein said legs include two first magnets and said extensions include two second magnets for engaging with said first magnets.

* * * * *